Figure 1:
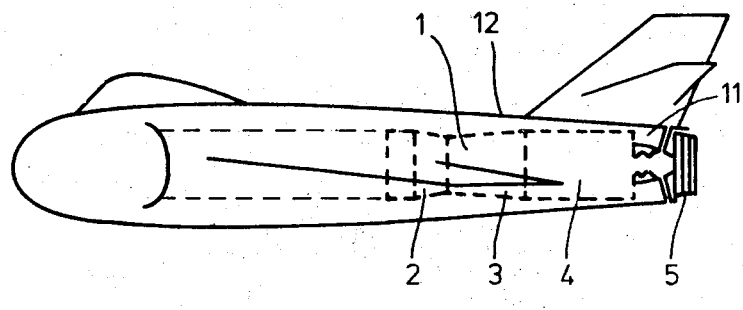

United States Patent
McMurtry

[15] 3,688,989
[45] Sept. 5, 1972

[54] THRUST REVERSERS FOR AIRCRAFT

[72] Inventor: David Roberts McMurtry, 21, Stoney Stile Road, Alveston near Bristol, England

[22] Filed: March 5, 1971

[21] Appl. No.: 121,512

[30] Foreign Application Priority Data

March 14, 1970 Great Britain..........12,354/70

[52] U.S. Cl. ..........239/265.29, 239/265.37, 244/53
[51] Int. Cl. .........................B64c 15/06, B64b 1/24
[58] Field of Search..244/52, 53; 239/265.29, 265.31, 239/265.33, 265.35, 265.37, 265.19, 265.17; 60/229, 230, 232, 226 A

[56] References Cited
UNITED STATES PATENTS 3,164,956   1/1965   Colebrook et al ...........239/265.29 X
3,610,533  10/1971   Johnson et al....239/265.37 X Primary Examiner—Trygve M. Blix
Attorney—Stevens, Davis, Miller & Mosher

[57] ABSTRACT

A thrust reverser linkage in which two main arms are pivoted together at a point between their ends in the manner of a pair of scissors. One end of one arm is connected to a thrust reverser bucket the other end being connected to aircraft structure. One end of the second arm is connected via a pivoted link with a thrust reverser bucket and the other end being movable by an actuating mechanism.

6 Claims, 4 Drawing Figures

PATENTED SEP 5 1972

3,688,989

SHEET 1 OF 2

THRUST REVERSERS FOR AIRCRAFT

The present invention relates to thrust reversers for aircraft, and in particular relates to an operating mechanism for a thrust reverser.

In some known thrust reversing systems in which the thrust reverser is of the target type, (i.e. in operation the buckets are positioned wholly downstream of the exhaust nozzle) the operating linkage is cumbersome and does not fold up into a sufficiently small space to enable it to be contained wholly within the aircraft structure. It has been necessary with these linkages therefore to provide a fairing or strake on the exterior of the aircraft structure to contain the linkage and this produces additional drag on the aircraft.

It is an object of the present invention to produce an improved type of operating linkage which may be used in place of these known linkages, and which folds up, when the reverser buckets are in their inoperative positions, into a sufficiently small space so that an external fairing is not required, or if required, is substantially reduced in size.

According to the present invention an aircraft is provided with at least one gas turbine jet propulsion engine mounted within aircraft structure, a thrust reverser comprising a pair of buckets which are movable from an inoperative position in which they form part of the aircraft structure to an operative position in which they lie in the path of the exhaust gases of the engine or engines, and an operating mechanism for each bucket of the thrust reverser, which mechanism comprises a pair of main arms pivoted together at a point between their ends, one end of one of the arms being directly pivotably connected to a first point on the thrust reverser bucket, one end of the second arm being connected to a second point on the thrust reverser bucket, spaced apart from the first point, by means of a pivotable extension link on said one end and means operable on one or both of the other ends of the arms to produce relative movement between said other ends to move the bucket between its operative and inoperative positions.

The said other end of one of the arms may be connected directly to the aircraft structure so that only one of the said other ends is movable.

The term 'aircraft structure' is to be taken to include the fuselage of an aircraft, or a pod with which an engine may be mounted externally of the fuselage.

According to a feature of the present invention an aircraft is provided with at least one gas turbine jet propulsion engine mounted within aircraft structure, a thrust reverser comprising a pair of buckets which are movable from an inoperative position in which they form part of the aircraft structure to an operative position in which they lie in the path of the exhaust gases of the engine or engines, and an operating mechanism for each bucket of the thrust reverser, which mechanism comprises a pair of main arms pivoted together at a point between their ends, in the form of scissors, one end of a first one of the arms being pivotably anchored to aircraft structure, and the other end being pivotably connected at a first point on the thrust reverser bucket, one end of the second one of the arms being connected to the thrust reverser bucket at a point spaced apart from said first point through a pivotable extension link, the other end of the second arm being connected to a second link which is anchored to aircraft structure, means being provided which is operable to move said other end of the second arm towards the anchored end of the first arm. Preferably the movable means comprises a further pivotable link anchored to aircraft structure and movable by means of an actuator to translate said second arm axially.

The further pivotable link may be anchored to aircraft structure at a point either above or below the said other end of the second arm In a preferred embodiment the further pivotable link, the second arm and the extension link on the second arm all lie in a straight line when the thrust reverser is in its operative position.

The actuator may be of any suitable type. Thus it may be a ram or jack, and may be hydraulically, pneumatically, electrically or mechanically operated. In the preferred embodiment the actuator takes the form of a jack operated by a lead screw rotated by an air motor.

Figure 4:
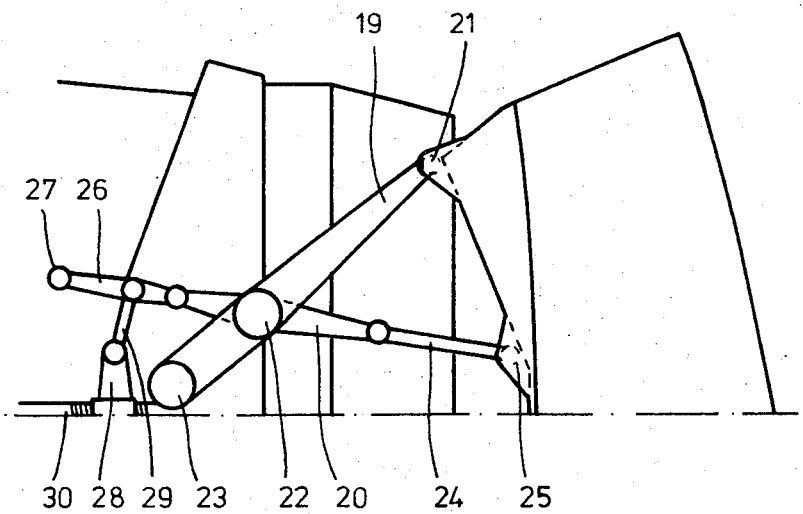
Figure 2:
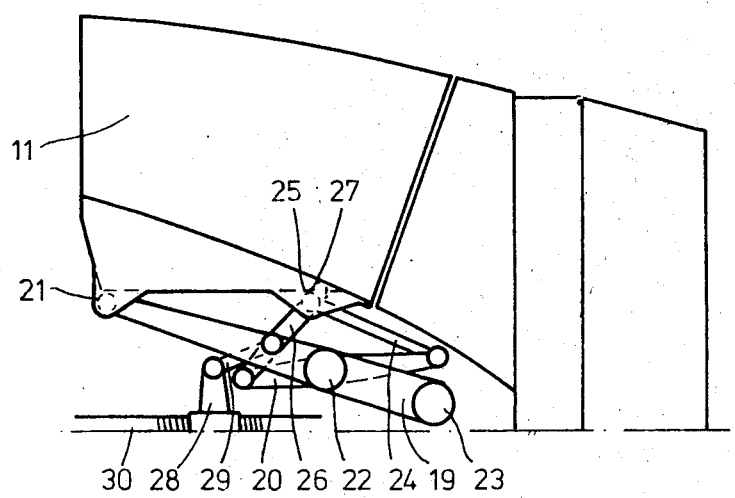
Figure 3:
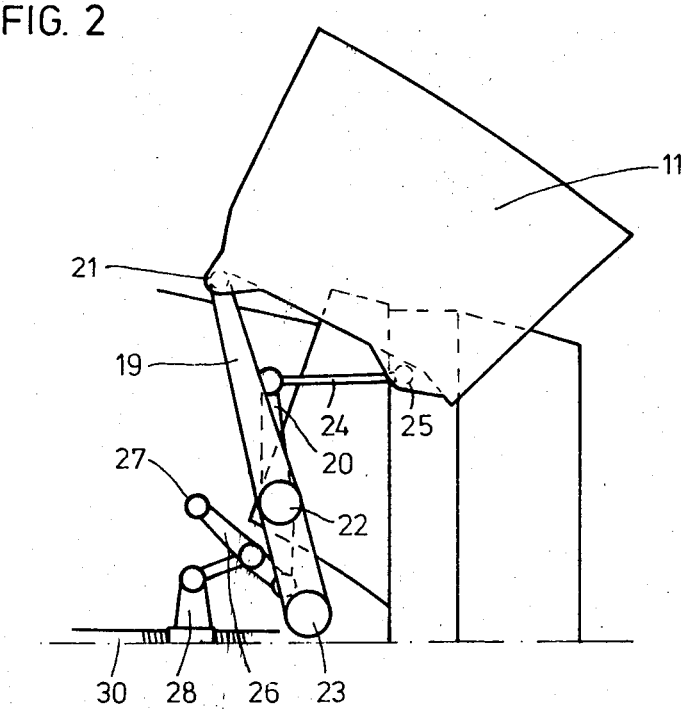

The invention will now be more particularly described, merely by way of example, with reference to the accompanying drawings in which:

FIG. 1 is a diagrammatic view of an aircraft according to the invention showing the thrust reversing buckets in the inoperative position, FIG. 2 shows half of the linkage in more detail with one of the buckets in the inoperative position, FIG. 3 shows the same linkage with the bucket in an intermediate position, and FIG. 4 shows the same linkage with the bucket in the operative position.

Referring now to the drawings, FIG. 1 shows an external view of an aircraft, and indicates, in dotted lines, the position of one of a pair of jet propulsion engines 1 which lie side by side in the fuselage of the aircraft. The engine 1 has the usual compressor means 2, combustion equipment 3, turbine means 4, and propulsion nozzle 5 all in flow series.

A thrust reverser is mounted from aircraft structure and consists of a pair of buckets 11 movable from an inoperative position, in which the buckets are stowed out of the path of the exhaust gases of the engine, into an operative position in which the exhaust gases from the propulsion nozzle 5 impinge on the buckets and are deflected to provide reverse thrust.

The buckets 11 are dimensioned so as to form a smooth continuation of the fuselage 12 of the aircraft, in which the engine is mounted, when in their inoperative position.

In the particular installation shown in FIG. 1 the nozzle 5 projects beyond the end of the aircraft fuselage and the thrust reverser buckets must therefore be moved in such a manner that the initial movement of each bucket is radially outwards and rearwards in order not to foul the downstream ends of the fuselage and nozzle.

Referring now to FIG. 2, 3 and 4 a linkage system which performs this type of movement is shown.

The linkage is basically a scissors type of linkage, the two main arms of the scissors being the arms 19 and 20 which are pivoted together at a main pivot 22. One end of the arm 19 is connected to the thrust reverser bucket 11 at its upstream end by means of a pivotable connection 21, and the other end of the arm is 'earthed' to aircraft structure by means of a pivot 23, (i.e. pivot 23 is fixed on aircraft structure).

One end of the other arm 20 is connected to an extension link 24 which is connected to the downstream end of the thrust reverser bucket by a pivot at 25. The other end of the arm 20 is connected to an extension link 26 which is 'earthed' to the aircraft structure at 27 by means of a pivot.

An actuating means which comprises a screw jack 28 is provided and is connected by an actuating link 29 to a point on the link 26.

The links are arranged so that when the thrust reverser is in its inoperative position they retract into the aircraft fuselage into a minimum space which does not require a local enlargement of the fuselage of the aircraft. Additionally, with the thrust reverser in its operative position the links form straight lines between the buckets and the 'earth' points on the aircraft fuselage, so that the links are in tension and there are no bending moments applied to any of the links or the screw jack.

The operation of the links is as follows: Starting from the stowed position shown in FIG. 2, axial rearward movement of the screw jack causes rotation of link 26 downwardly and rearwardly about its pivot 27. This movement, together with the axial movement of the jack causes the main arm 20 to rotate anti-clockwise (as seen in the Figure) about the main pivot 22 while at the same time the main arm 19 rotates clockwise about its pivot 23. This movement lifts upstream end of the bucket 11 radially and rearwardly and since the pivot between links 24 and 20 moves radially outwardly and forwardly, the movement of the link 24 is determined and it swings upwardly and rearwardly to move the downstream end of the bucket 11.

FIG. 3 shows an intermediate position of the thrust reverser bucket from which it can be seen that the two main arms 19 and 20 become substantially vertical while the link 24 has become horizontal.

Further rearward movement of the jack 28 axially continues the rotation of the main arm 19, and hence rotates the arm 20 clockwise about the main pivot 22, so that the bucket finally comes to rest in its operative position downstream of the nozzle with the links 26 and 24, and the arm 20 in a straight line between pivots 27 on the aircraft structure and pivot 25 on the bucket.

The relative positions of the various links arms and pivots is determined by certain criteria based on design practice, together with a certain amount of trial and error to produce the linkage with the optimum size for a given installation.

Apart from the main design criterion for the present thrust reverser which is to provide a linkage which would fold up into a minimum size to enable it to be stowed within the aircraft fuselage, the arrangement of the links shown in the figures was arrived at in order to fulfil additional secondary criteria namely that:

a. the initial movement of the buckets should be both radial and rearwards,
b. the buckets once deployed should fail into the reverse thrust position, and
c. the links and arms should form straight lines between the earth points and the buckets to avoid introducing bending stresses into the linkage.

Clearly, therefore, while the basic "scissors type" of linkage is essential to fulfil the main criteria, the numbers and dispositions of the remaining links are variable according to which of the secondary criteria it is required to fulfil.

An example of some of the design considerations required for the particular embodiment illustrated are as follows:

Starting with the basic scissors arrangement the length of the arm 19 is determined by the initial and final positions of the bucket 11, the positions of pivots 21 and 23, and the proximity of the fuselage.

The height of pivot is a compromise between the two conflicting requirements:

a. that the arm 19 should be as near horizontal as possible in the inoperative position of the bucket to give a near vertical initial movement to the bucket and
b. the thrust vector of the resultant load on the bucket should pass through a point sufficiently above the pivot 23 to provide enough moment on the arm 19 in the operative position of the bucket, so that the bucket is urge into its operative position by the resultant load on it. This calls for a point near the engine axis for pivot 23.

Once these points have been fixed the position of the pivot 22 has to be determined, and this is governed by:

a. the length of link 26 which must not foul its opposite number on the other side of the engine centerline, or the screw jack if both are in the same plane.
b. the rearward end of the arm 20 designated X must not extend further rearwards than the end of arm 19 to avoid fouling the fuselage and,
c. the distances between pivot 22 and point X, in addition to the distance from point X to pivot 25 must be sufficient to enable the links 26, 24 and arm 20 to form the straight line needed.

The actuating means in the above example is a jack 28 movable by means of a lead screw 30, driven by a motor (not shown) which may be hydraulically, pneumatically or electrically driven.

Any other suitable form of actuator may be used for example, a hydraulic ram.

It will also be understood that the linkage shown in this example is merely illustrative of one type of linkage which suited the particular installation. The scissor arms 19 and 20 may be connected to the bucket or to the aircraft structure or actuating mechanism by means of different arrangements of links and still provide the requisite movement.

For example, the anchor link 26 may be anchored at a point below pivot connection between link 26 and arm 20, resulting in a re-positioning of the point of actuation of the actuating jack 28.

I claim

1. An aircraft provided with at least one gas turbine jet propulsion engine mounted within aircraft structure, a thrust reverser comprising a pair of buckets which are movable from an inoperative position in which they form part of the aircraft structure, to an operative position in which they lie in the path of the exhaust gases of the engine, and an operating mechanism for each bucket of the thrust reverser, which mechanism comprises a pair of main arms pivoted together at a point between their ends, one end of one of the arms being directly pivotably connected to a first point on the thrust reverser bucket, one end of the second arm being connected to a second point on the thrust reverser bucket, spaced apart from the first point, by means of a pivotable extension link on said one end, and means operable on one of the other ends of the arms to produce relative movement between said other ends to move the bucket between its operative and inoperative positions.

2. An aircraft according to claim 1 and wherein said other end of one of the arms is connected directly to the aircraft structure so that only one of said other ends is movable.

3. An aircraft provided with at least one gas turbine jet propulsion engine mounted within aircraft structure, a thrust reverser comprising a pair of buckets which are movable from an inoperative position in which they form part of the aircraft structure, to an operative position in which they lie in the path of the exhaust gases of the engine, and an operating mechanism for each bucket of the thrust reverser, which mechanism comprises a pair of main arms pivoted together at a point between their ends, in the form of scissors, one end of a first one of the arms being pivotably anchored to aircraft structure, and the other end being pivotably connected at a first point on the thrust reverser bucket, one end of the second one of the arms being connected to the thrust reverser bucket at a point spaced apart from said first point through a pivotable extension link, the other end of the second arm being connected to a second link which is anchored to aircraft structure, means being provided which is operable to move said other end of the second arm towards the anchored end of the first arm.

4. An aircraft as claimed in claim 1 and wherein the operable means comprises a further pivotable link movable by means of an actuator to translate said second arm axially.

5. An aircraft as claimed in claim 3 and wherein the second link, the second arm and the extension link on the second arm all lie in a straight line when the thrust reverser is in its operable position.

6. An aircraft as claimed in claim 1 and wherein the arms and links of the operating mechanism are arranged so that the initial movement of the buckets from their inoperative position has a major component in a direction normal to the line of the aircraft fuselage.

* * * * *